United States Patent
Chareire

[11] Patent Number: 5,553,689
[45] Date of Patent: Sep. 10, 1996

[54] ADDITIONAL STRUCTURE FOR IMPROVING THE PRESSURE DISTRIBUTION ON THE DISKS OF AN AIRCRAFT BRAKE

[76] Inventor: Jean-Louis Chareire, 66 rue Aristide Briand, 92300 Levallois, France

[21] Appl. No.: 308,846

[22] Filed: Sep. 19, 1994

[30] Foreign Application Priority Data

Sep. 17, 1993 [FR] France .................. 93 11087

[51] Int. Cl.$^6$ ............................................. F16D 55/36
[52] U.S. Cl. ................. 188/217; 188/71.5; 188/264 G
[58] Field of Search ................. 188/73.1, 71.6, 188/72.4, 73.39, 73.46, 217, 258, 264 A, 264 R, 264 G, 71.4, 72.5, 367, 366, 71.5; 192/85 AA, 89.261, 113.4

[56] References Cited

U.S. PATENT DOCUMENTS

| | | | |
|---|---|---|---|
| 2,849,086 | 8/1958 | Martin | 192/85 AA |
| 3,747,712 | 7/1973 | Stout | 188/73.2 |
| 4,147,241 | 4/1979 | Preniczny et al. | 188/264 G |
| 4,358,004 | 11/1982 | Dowell et al. | 188/217 |
| 5,010,986 | 4/1991 | Lammers et al. | 188/71.5 |
| 5,035,305 | 7/1991 | Lammers | 188/71.5 |

FOREIGN PATENT DOCUMENTS

| | | |
|---|---|---|
| 2060889 | 5/1971 | France . |
| 2457413 | 5/1980 | France . |
| 2043363 | 9/1970 | Germany . |
| 6159404 | 6/1996 | Japan . |
| 1324991 | 7/1973 | United Kingdom . |

Primary Examiner—Douglas C. Butler

[57] ABSTRACT

The invention relates to a floating metal structure (11) usable in most aircraft brakes. This structure aims at better distributing the pressure applied by the jacks, actuators or cylinders (7). The structure (11) is a ring with a U-shaped section having a flat base (13) and into which are freely introduced the jacks (7) which, also ensure the centering thereof. In a first solution, the contact of said structure takes place directly between the base (13) of the U and the first disk. In a second solution, contact takes place by means of a number of support shims or blocks (18) which is equal to the total number of active and inactive jacks (7) and arranged in staggered manner with respect thereto. These shims (18) remaining effective on alternating the active and inactive jacks (7), so that they act as if the number of jacks was doubled. Moreover, the structure (11) helps to thermally protect the jacks.

12 Claims, 2 Drawing Sheets

ADDITIONAL STRUCTURE FOR IMPROVING THE PRESSURE DISTRIBUTION ON THE DISKS OF AN AIRCRAFT BRAKE

TECHNICAL FIELD

The invention relates to an additional floating metal structure for improving the pressure distribution on the disks of an aircraft brake.

BACKGROUND ART

A conventional aircraft brake comprises a coaxial stack of friction disks, which are called rotors and stators.

The rotors are rotated by the rim of the wheel, via a plurality of pins located on the interior of the rim and parallel to its axis. They can consequently slide with respect to the rim.

By an identical principle, the stators are linked in rotation with the wheel axle, whilst being able to slide with respect to said axle.

The rotors and stators are stacked in an alternating manner and it is merely necessary to axially compress the system for braking to take place. This compression is brought about by a plurality of hydraulic jacks arranged axially on a circumference having a diameter close to the mean diameter of the friction or rubbing faces of the disks. This plurality of jacks is fixed to the wheel hub. Opposite to the stack of disks with respect to the jacks are also fixed to the wheel hub a certain number of support points centered on the mean diameter of the rubbing faces of the disks.

In order to control friction, only half the number of Jacks is used, the other half serving as a standby, security system. However, there is nothing to distinguish the two groups of jacks, which are also arranged in alternating manner on the circumference.

In the prior art, the jacks bear directly on the face of the first stack of the disk, which is always a stator because it must not slide with respect to the jacks.

The aim of this configuration is to gain weight. For the same reason the number of jacks arranged in circumferential manner is as small as possible. For a commercial airliner there are e.g. in general 10 to 14 jacks, i.e. 5 to 7 simultaneously active jacks.

Bearing in mind the diameter of the disks, the distance between the active jacks is consequently approximately 20 cm. This distance is considerable compared with the thickness of the disks, so that there is a very significant pressure variation between the disks as a function of the jack spacing. When the disks are made from carbon and more particularly good heat conducting carbon, so that they are not very hard, this pressure heterogeneity is responsible for an increase in wear.

This pressure heterogeneity also leads to temperature heterogeneities and more particularly to very hot zones in the extension of the axis of the jacks. As the friction coefficient of carbon and many friction materials decreases greatly with the temperature, there is a very significant reduction in the stopping performance, particularly in the case of an aborted take-off.

The object of the invention is to very significantly reduce the pressure heterogeneity, whilst only adding a relatively small mass or weight to the already produced brake.

DISCLOSURE OF THE INVENTION

In a first embodiment of the invention is proposed a floating metal structure interposable between the ends of the jacks of an aircraft brake and the disk closest to the brake with a view to improving the distribution of pressure on the said disk and the following disks, characterized in that its general shape is circular and coaxial with the disks and in that its radial section is a U with a flat base in which are inserted with an adequate clearance and bear the ends of all the jacks, the ends of the sides of the U being extended towards the exterior of the U so as to form two concentric rings with a profile substantially parallel to the base of the U.

This leads to a light, but very stiff floating metal structure.

This solution can be applied without other changes to existing brakes and it is original in the sense that it has the form with the optimum stiffness and weight performance characteristics bearing in mind the spaces available on all existing brakes on either side of the end of the jacks. The circular structure can be produced from sheet metal or metal machined in the mass. Its section along the circumference thereof is that of a flat-bottomed U and having to the right and left at the top of the U a segment parallel to the base. The sum of these segments is substantially equal to the length of the flat base. However, this length arrangement is not imperative and variants can be envisaged, particularly taking account of the thicknesses of the various zones.

The height of the U is equal to the distance separating the jack fixing plate from the disk surface when the length of the jacks is a minimum.

The sides of the U are intended to surround with a certain operating clearance the base of all the jacks.

The end of the jacks is only separated from the first disk by the thickness of the structure, which is negligible for the geometry of the brake.

For information purposes, a circular steel structure according to the invention weighing approximately 2 kg improves significantly the pressure distribution on a brake, because its stiffness is equivalent to that of two of the thickest disks for a system of 9 carbon disks weighing 50 kg.

When this solution is adopted, it is preferable for the support pads screwed to the end of the Jacks to be square or rectangular or, in the optimum case, in the form of a radial ring sector in order to improve the transmission of forces to the metal structure.

In a second embodiment of the invention a floating metal structure is proposed, which can be interposed between the ends of the jacks of an aircraft brake and the disk closest to the jacks, with a view to improving the distribution of pressure on said disk and on the following disks, characterized in that its face intended to come into contact with the disk closest to the jacks is provided with a number of shims identical to the total number of jacks, the shims being centered on the bisector of the angle at the centered between two jacks as a result of angular marking means between the metal structure and at least one of the jacks.

This solution is complimentary to that given hereinbefore, but according to the invention, it can optionally relate to a structure initially substantially different from that described hereinbefore.

It consists of fixing, e.g. by welding or soldering, thin shims beneath the base of the U, i.e. between said base and the first disk of the brake. These shims are arranged in staggered manner with respect to the active and inactive jacks.

If a brake has a total of 10 active and inactive jacks there are consequently 10 shims below the bottom of the U and each of them is positioned between two jacks.

In this case, the U structure is equipped with an angular marking making it possible to position it angularly with respect to at least one jack. Thus, with said shims, the number of support or bearing points is equal to the sum of the active and inactive jacks, i.e. it is twice that of the prior art situation. The behaviour of the brake is unchanged on passing from the active to the inactive jacks.

The interest of this solution is that the deflection or sag f of the disks responsible for the pressure heterogeneities is in the following form:

$$f = K \frac{P \times L^3}{E \times I}$$

P=load per jack
L=distance between jacks
E=modulus of elasticity in the plane
I=moment of inertia
K=a coefficient dependent on the setting into the supports and the load distribution type, it being difficult to accurately determine, but remains valid on a comparative basis.

Thus, with double the number of Jacks the deflection tends to be eight times lower. This factor is a minimum because, bearing in mind the diameter of the jacks, the free bearing reduction takes place in a factor exceeding two.

The advantage of said second solution compared with the first is therefore on the one hand being much more efficient for the same weight and on the other is more independent of the stiffness of the U-structure, so that the latter can be lightened.

The sags or deflections attained under load in the case of the above example are very small, so that very thin shims can be used according to the invention. Their thickness is preferably between the sag corresponding to the yield strength of the metal from which the U structure is formed and the sag corresponding to the maximum force applied in practice added to the sag of the first disk.

Another possibility according to the invention consists of observing that the practical application of the maximum load is extremely rare and therefore has little effect on the wear. It is therefore possible to give the shims thicknesses such that they ensure the most regular possible pressure distribution during frequent braking operations at medium pressure and that when in exceptional cases the pressure increases, the clearance between the axis of the active pistons is cancelled out between the flat bottom of the U structure and the first disk of the stack.

Thus, the U structure is protected against the possibility of undergoing significant deflections which could give it a permanent deformation if its temperature was high at that particular instant.

The dimensions of the shims according to the invention, other than their thickness, can vary relatively significantly. However, it is logical that their width measured radially with respect to the disk is identical to that of the base of the U.

The length thereof in the circumferential direction can evolve under the following conditions:

if it is short, the principle of the invention is perfectly respected from a theoretical standpoint, because the bearing points on the first disk are equidistant;

if it increases, the bearing zone tends to approach the active jacks due to the deflection of the U structure.

However, if the U structure is relatively rigid, it can be of interest to increase the circumferential length of the shims in order to combine the advantages of the first and second solutions according to the invention.

The U structure according to the invention also has the advantage of providing a heat protection for the jacks, as a result of the fact that they are no longer in direct contact with the disks which heat. It is possible to use support shims made from insulating and adequately refractory materials. For this purpose, with the shim thicknesses being very small (approximately 0.05 to 1 mm), it is possible to envisage various solutions such as e.g.:

deposits of not very conductive ceramics or which are sintered and with low density, use of relatively slightly conductive metals (stainless steel, etc.), use of porous sintered metals.

The U-shaped metal structure can also be made from slightly conductive steel.

In the case where no use is made of shims, the thermal contact is good between the first disk and the U-shaped metal structure. This structure can then serve as a heat radiator during the ventilation of the brakes following a landing. The shape of the U structure gives it a large exchange surface with the ambient air and can therefore be used for more rapidly extracting the heat from the very compact disks. When this ancillary use of the U structure is adopted, it is possible according to the invention to further increase its efficiency by welding to it metal fins having a negligible weight. Thus, the U structure can be used as a heat exchanger or insulator. However, in all cases, this structure thermally protects the jacks.

BRIEF DESCRIPTION OF THE DRAWINGS

The invention is described in greater detail hereinafter relative to non-limitative embodiments and the attacked drawings, wherein show.

DETAILED DESCRIPTION OF THE INVENTION

Figure 1:
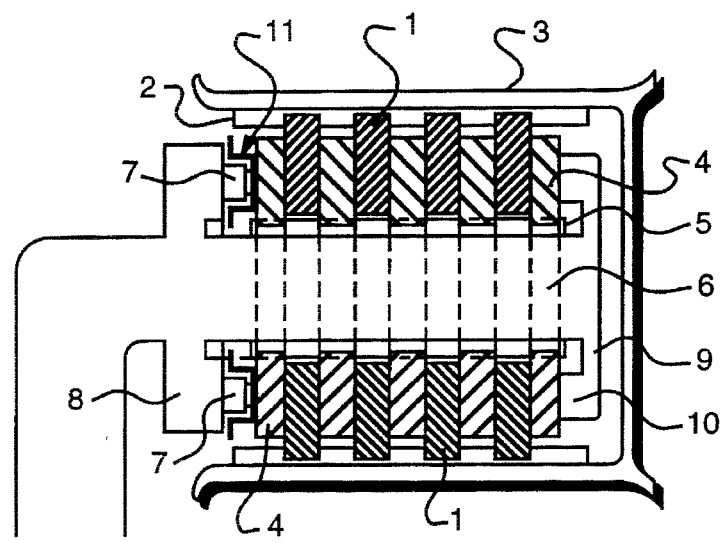
FIG. 1 A diagrammatic section of an aircraft disk brake.

FIG. 1 shows the rotor disks 1 of an aircraft brake rotated by pins 2 integral with the wheel rim 3, the tire not being shown. It is also possible to see the brake stator disks 4 locked in rotation by the pins 5 integral with the wheel hub 6. The rotor 1 and stator 2 disks are arranged in alternating manner in order to form a stack of disks.

A plurality of jacks 7 is fixed to a ring 8 integral with the hub 6 in front of one end of the stack. Moreover, the disks are secured axially at the other end of the stack by a retaining ring 9 generally having a plurality of support or bearing points 10.

Figure 2:
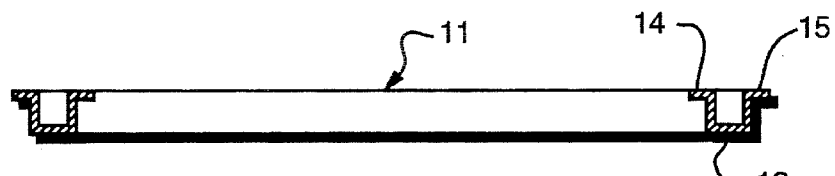
FIG. 2 A diametrical sectional view illustrating a first embodiment of the metal structure according to the invention.
Figure 3:
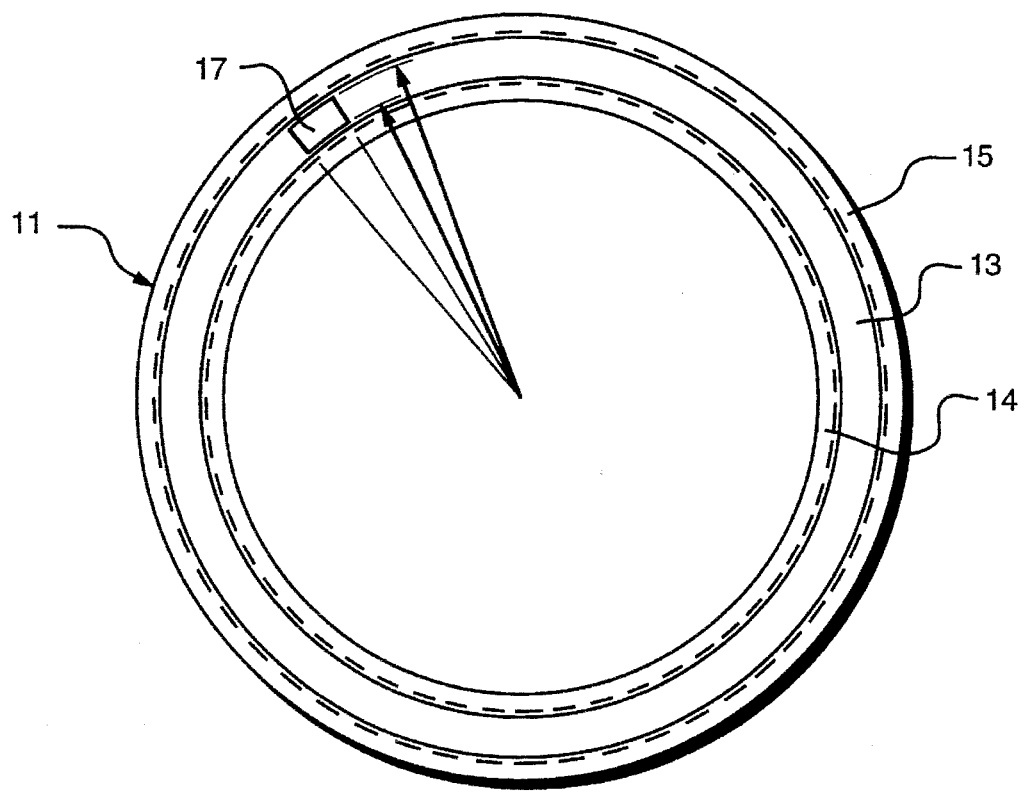
FIG. 3 An axial view of the metal structure of FIG. 2 showing the support of one of the jacks.

According to the invention, a circular metal structure 11, shown in FIGS. 2 and 3, is placed between the pistons of the jacks 7 and the adjacent stator disk 4. This circular metal structure has a U-shaped section with a flat base 13. The sides 12a, 12b (FIG. 4) of the U formed in section by the metal structure 11 are extended towards the outside of the U, parallel to the flat base 13, in the form of segments 14, 15, whereof the sum of the lengths is substantially equal to that in section of the flat base 13. Moreover, each of the segments 14, 15 has substantially the same length.

FIG. 3 shows that the segments 14 and 15 are in fact internal 14 and external 15 concentric rings.

Figure 4:
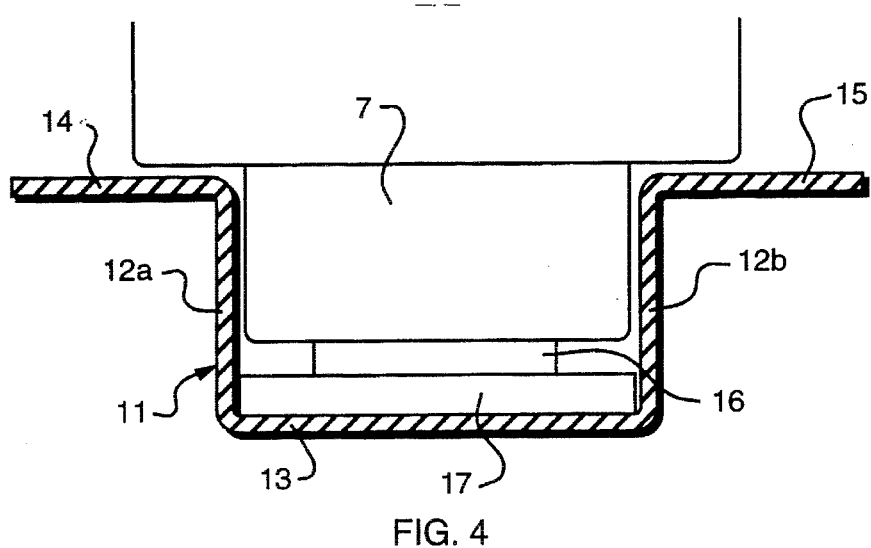
FIG. 4 A radial sectional view of the metal structure of FIGS. 2 and 3 through the axis of one of the jacks.

FIG. 4 shows the position of the metal structure 11 with respect to each of the jacks 7. The width of the U formed in section by the structure 11, i.e. the distance between the substantially parallel sides 12a, 12b, slightly exceeds the diameter of the cylinder of the jacks, 7. Consequently, the latter are placed between the sides 12a, 12b in such a way that the metal structure 11 can slide freely around the cylinder of the jacks 7.

The ends of the pistons 16 of the jacks 7 are equipped with support pads 17 coming into contact with the base 13 of the structure 11. These support pads 17 freely penetrate said structure. Their function is in particular to centre the structure 11 relative to the axis of the brake. They are also used for transmitting the force to the structure 11 in an optimum manner and for this purpose it is preferable to replace the conventional circular support pads by pads 17 having the shape of ring sectors, like that shown in FIG. 5.

The height of the U formed in section by the structure 11, i.e. the height of the sides 12a, 12b, is equal to the distance separating the ring 8 carrying the jacks 7 from the surface of the first stator disk 4, when the jacks are completely retracted.

The metal structure 11 is made from a light, refractory metal with a high modulus of elasticity, beryllium being preferred. It is also possible to use other metals such as steel.

The structure 11 is easily shaped by forging or machining, or e.g. the assembly of welded or riveted components. The represented shape of the metal structure 11 can, according to the invention, undergo numerous modifications more particularly with respect to the local thicknesses, angles and proportions between the lengths of the various segments.

Figure 5:
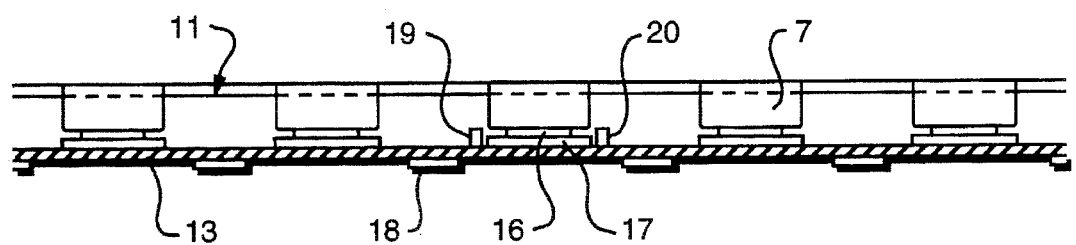
FIG. 5 A developed view of a plurality of jacks bearing on the bottom of a metal structure shown in section, illustrating a second embodiment, in which the support shims and a system for angular positioning with respect to the jacks are installed on the structure.

FIG. 5 shows the second embodiment of the invention, in which the support shims 18 are positioned between the first stator disk 4 of the brake and the metal structure 11 and are fixed to the latter.

It is possible to see a plurality of jacks 7 located on the same circumference, shown in developed form in FIG. 5, as well as the section of the structure 11 passing through the axis of all the jacks 7. It is possible to see the shims 18 equidistant between adjacent jacks 7.

It should be noted that this principle of shims 18 is inseparable from an additional metal structure 11, but that the latter can have, according to the invention, a much less mechanically optimized shape than that forming the object of the first embodiment.

FIG. 5 also shows two brackets 19, 20 for angularly marking during installation the metal structure 11 with respect to the jacks 7, in such a way that the shims 18 are indeed mid-distance from the jacks. The brackets 19, 20 are formed on the inner face of the flat base 13 of the structure 11 and are separated by a distance slightly exceeding the circumferential length of the pads 17, so that they are placed on either side of one of them.

It should be noted that the brackets 19, 20 are in no way limitative with respect to the invention and numerous other means can be used for permitting the angular positioning of the metal structure 11.

Figure 6:
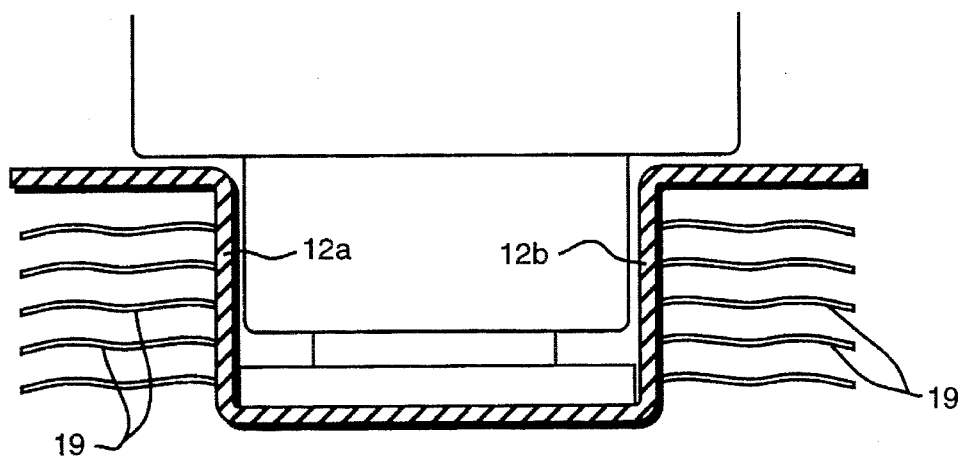
FIG. 6 A radial sectional view through the axis of a jack illustrating a variant of the metal structure, in which cooling fins in the form of concentric rings are installed on the structure.

FIG. 6 shows a variant in which the metal structure 11 is equipped with a heat exchanger constituted by fins 19, which are spaced, superimposed concentric rings fixed to the sides 12a, 12b by any means ensuring a good thermal contact, e.g. welding.

As a variant and whilst occupying the same location as the ring fins 19 in FIG. 6, the fins can also be located in planes passing through the axis of the structure 11, or in the form of coaxial cylinders fixed to the inner 14 and outer 15 rings.

I claim:

1. An aircraft brake comprising:

a wheel rim;

a wheel hub;

rotor disks adapted to rotate with the wheel rim;

stator disks adapted to be locked in rotation by the wheel hub, and arranged in alternating manner with rotor disks, whereby to form a stack of disks arranged along a common axis;

a first ring integral with the wheel hub and facing a first end of the stack of disks;

a retaining ring facing another end of the stack of disks;

a plurality of jacks each having a cylinder carried by the first ring and a piston adapted to engage a first disk of said stack of disks; and a floating metal structure interposed between said first disk and the pistons of said plurality of jacks, for distributing pressure exerted on the stack of disks;

wherein said floating metal structure has a generally circular shape, is arranged coaxially with the disks and has substantially a U shape in cross-section, said floating metal structure thus having a flat base, two substantially parallel sides, and internal and external concentric rings extending towards the outside of the U shape in cross-section, substantially parallel to the flat base;

wherein the cylinders of the jacks are inserted between the sides of said floating metal structure, with a given clearance; and wherein all the pistons of the jacks bear on the flat base of said floating metal structure.

2. An aircraft brake according to claim 1, wherein an end of each piston is equipped with a support pad freely penetrating the floating metal structure.

3. An aircraft brake according to claim 2, wherein each support pad has a ring sector shape.

4. An aircraft brake according to claim 1, wherein the floating metal structure comprises heat exchanger means, including fins carried by at least one of the sides and the rings of said structure.

5. An aircraft brake according to claim 1, wherein the floating metal structure carries a plurality of support shims on a face of said structure contacting the first disk, a same number of support shims and of jacks being provided; and wherein said floating metal structure is provided with angular positioning means cooperating with at least one of the jacks, whereby each support shim is located equidistant between two adjacent jacks.

6. An aircraft brake according to claim 5, wherein the support shims has a thickness such that portions of the floating metal structures engaged by said pistons directly contact said first disk when pressure exerted on the stack of disks reaches a predetermined value.

7. An aircraft brake according to claim 5, wherein the support shims are made from an insulating and refractory material selected from the group consisting of a slightly conductive ceramic, a sintered ceramic with low density, and a porous, sintered metal.

8. An aircraft brake according to claim 5, wherein the floating metal structure comprises heat exchanger means, including fins carried by said structure.

9. An aircraft brake comprising:

a wheel rim;

a wheel hub;

rotor disks adapted to rotate with the wheel rim;

stator disks adapted to be locked in rotation by the wheel hub, and arranged in alternating manner with the rotor disks, whereby to form a stack of disks arranged along a common axis;

a first ring integral with the wheel hub and facing a first end of the stack of disks;

a retaining ring facing another end of the stack of disks;

a plurality of jacks each having a cylinder carried by the first ring and a piston adapted to engage a first disk of said stack of disks; and a floating metal structure interposed between said first disk and the pistons of said plurality of jacks, for distributing pressure exerted on the stack of disks;

wherein said floating metal structure has a generally circular shape, is arranged coaxially with the disks and has substantially a U shape in cross-section;

wherein said floating metal structure carries a plurality of support shims on a face of said structure contacting the first disk, a same number of support shims and of jacks being provided; and wherein said floating metal structure is provided with angular positioning means cooperating with at least one of the jacks, whereby each support shim is located equidistant between two adjacent jacks.

10. An aircraft brake according to claim 9, wherein the support shims have a thickness such that portions of the floating metal structures engaged by said pistons directly contact said first disk when said pressure exerted on the stack of disks reaches a predetermined value.

11. An aircraft brake according to claim 9, wherein the support shims are made from an insulating and refractory material selected from the group consisting of a slightly conductive ceramic, a sintered ceramic with low density and a porous, sintered metal.

12. An aircraft brake according to claim 9, wherein the floating metal structure comprises heat exchanger means, including fins carried by said structure.

* * * * *

UNITED STATES PATENT AND TRADEMARK OFFICE
CERTIFICATE OF CORRECTION

PATENT NO.   :   5,553,689
DATED        :   September 10, 1996
INVENTOR(S)  :   Jean-Louis Chareire It is certified that error appears in the above-indentified patent and that said Letters Patent is hereby corrected as shown below:

On title page, after the inventor information, insert:

item  "[73] Assignee: Aerospatiale Societe Nationale Industrielle, France"

Signed and Sealed this

Thirty-first Day of December, 1996

*Attest:*

BRUCE LEHMAN

*Attesting Officer*    *Commissioner of Patents and Trademarks*